No. 880,015. PATENTED FEB. 25, 1908.
J. F. DE LONG.
TRUCK.
APPLICATION FILED SEPT. 17, 1907.
2 SHEETS—SHEET 1.
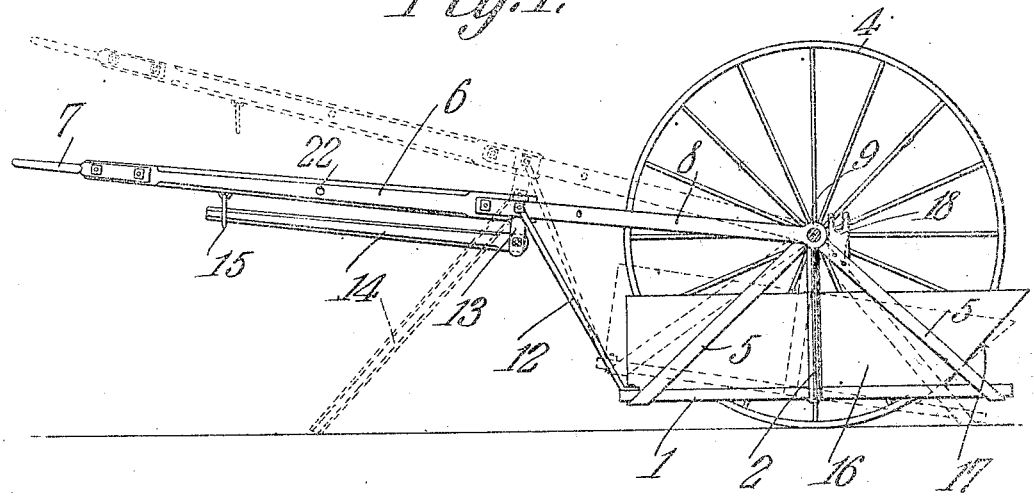
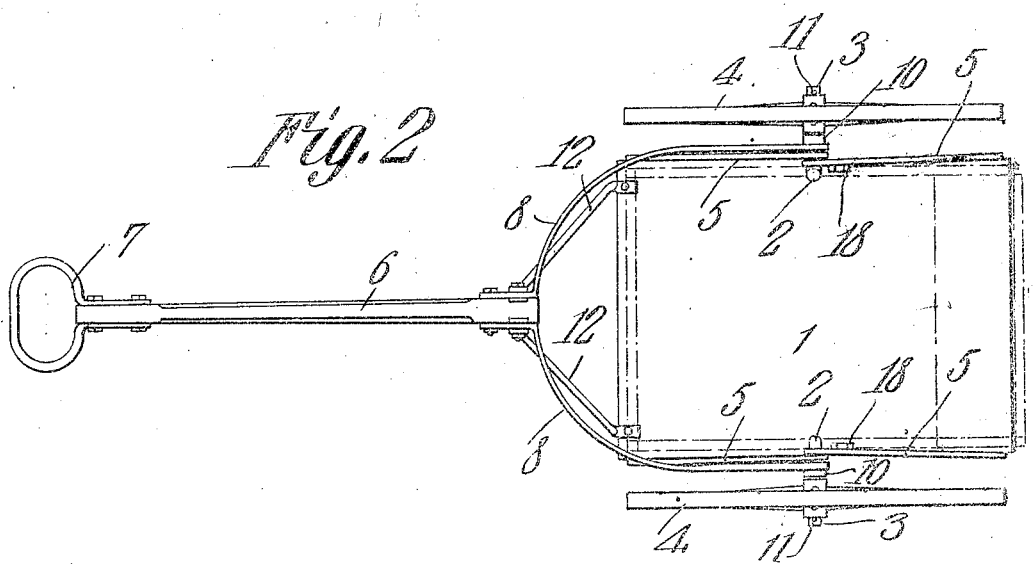
Jacob F. DeLong
Inventor.
Witnesses No. 880,015. PATENTED FEB. 25, 1908.
J. F. DE LONG.
TRUCK.
APPLICATION FILED SEPT. 17, 1907.
2 SHEETS—SHEET 2.
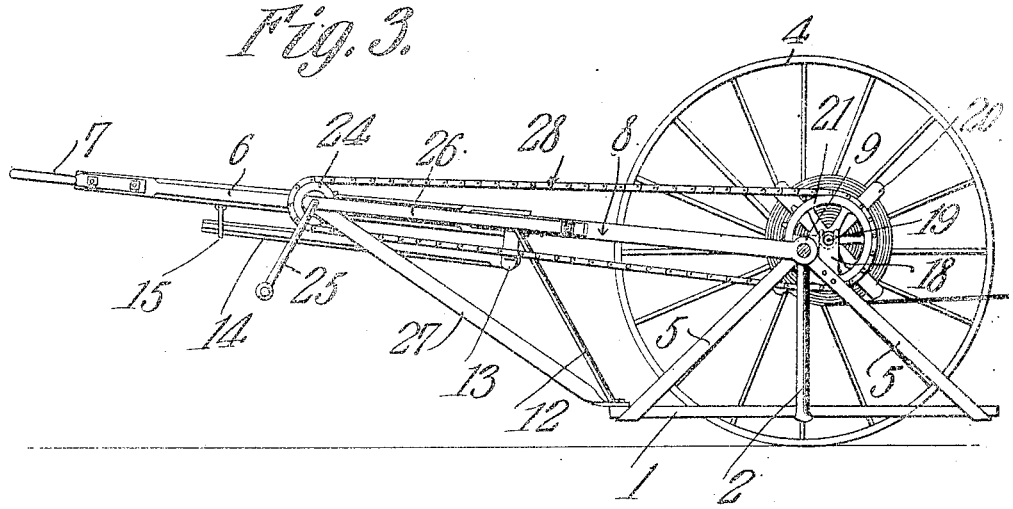
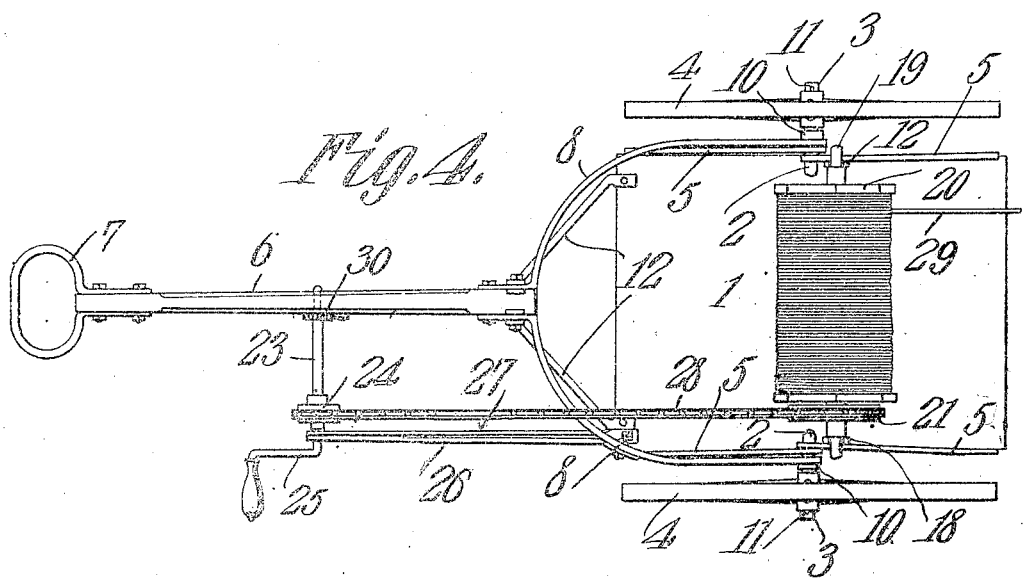
Jacob F. DeLong,
Inventor.
Witnesses

UNITED STATES PATENT OFFICE.

JACOB F. DE LONG, OF BRISTOW, IOWA.

TRUCK.

No. 880,015.

Specification of Letters Patent.

Patented Feb. 25, 1908.

Application filed September 17, 1907. Serial No. 393,268.

*To all whom it may concern:*

Be it known that I, JACOB F. DE LONG, a citizen of the United States, residing at Bristow, in the county of Butler and State of Iowa, have invented a new and useful Truck, of which the following is a specification.

This invention has reference to improvements in trucks, more particularly of the type useful on farms or other places where various articles are to be transported from place to place and certain operations are to be performed wherein the truck may be a useful adjunct.

The invention comprises essentially a pendent platform carried by a drop axle upon the ends of which are mounted suitable supporting wheels, and connected to the axle is a yoke frame lifting the platform clear and constituting the connection between the axle and a suitable handle or pole which, in turn, is connected to one end of the platform, so that the platform may be turned on a horizontal axis about the wheels.

Pivotally connected to the handle there is a bar so constructed as to serve to support the platform in an inclined position, so that that end remote from the handle may be brought into contact with the ground when the pivoted bar is also brought with its free end in contact with the ground, thus holding the structure rigid when it is desired to load anything upon the platform and for other purposes which will hereinafter appear. There is also provided means for the support of a reel for carrying wire and a crank on the handle and connections therefrom to the reel for operating the same, while the structure may be propelled and guided by an operator at the same time at which he manipulates the crank to turn the reel, thus enabling the operator to wind up wire strands of such nature as barbed wire strands while maintaining a proper tension by the manipulation of the handle so as to guide the truck in the proper manner for the purpose.

The invention will be best understood by reference to the following detailed description, taken in connection with the accompanying drawings forming part of this specification, in which,—

Figure 1 is a side elevation of the truck with one wheel omitted and the axle shown in section, with one phase of operation of the truck indicated in dotted lines; Fig. 2 is a plan view of the structure shown in Fig. 1; Fig. 3 is a side elevation, partly in section, similar to Fig. 1 but showing the winding reel in position; and Fig. 4 is a plan view of the structure shown in Fig. 3.

Referring to the drawings, there is shown a platform 1 carried about midway of its length by a drop axle 2, which axle has laterally projecting ends 3 upon which are mounted wheels 4 such as are commonly used in farm trucks, the tires being made appropriately broad for the purpose. The drop of the axle is such that the platform rests but a short distance above the ground when in a horizontal position. Extending from the portions 3 of the axle down to the ends of the truck are diagonal braces 5. The platform 1 is thus held at a central point and at each end on each longitudinal side. The truck is also provided with a handle or pole 6 formed at one end with a loop 7 constituting a handhold and at the other end having bolted to it two irons 8 suitably bent to form a fork the free ends of which are made with eyes 9 to embrace the ends 3 of the axle. Exteriorly to the fork arms 8 each axle end 3 may be surrounded by a collar 10 forming an inside bearing for the hub of the wheel 4, and each wheel may be prevented from coming off the axle by an exterior pin 11 passed through the axle near the extreme outer end thereof. The pin 11 may be of the familiar cotter type.

Brace rods 12 are each connected at one end to the handle or tongue 6 and then extend downward, receding one from the other, and have their lower ends connected to the platform 1 near the sides thereof. The fork arms 8 and the braces 5 and 12 as well as the axle 2 constitute a rigid support for the platform, which, together with the handle 6, is movable about the axis of the axle and the structure may be moved from place to place as desired upon the wheels 4. On the lower side of the inner end of the handle 6 there is a depending yoke 13 to which is pivotally connected a bar or leg 14 the free end of which is normally supported by a loose ring 15 depending from the under side of the handle 6 so that this leg may be held in a position parallel with and close to the handle 6 or, when loosened from the ring 15, the free end may be dropped down to engage the ground. Now, when it is desirable to roll anything upon the platform 1 the hand-hold 7 of the handle 6 is lifted until the remote end of the platform 1 is brought into engagement with the ground and the leg 14 has its free end also brought into engagement with the ground, thus forming a brace holding the end of the platform against the ground and preventing the truck from moving when anything is lifted up on to the platform. Since one end of the platform is in engagement with the ground it is an easy matter to move any heavy object such, for instance, as a barrel, upon said platform. Or, the platform may carry a box 16 having one end 17 slanting so that a shovel or fork may have easy access to the box at the slanting end when the platform is tipped with its edge in contact with the ground. Or, in the case of a barrel, the contents are more easily reached when the barrel is slightly tipped as occurs when the dumping end of the platform is in contact with the ground, as indicated in the dotted line position in Fig. 1.

Fixed upon one pair of brace rods 5 are journal bearings 18 to receive the journals 19 of a reel 20 having at one end a sprocket wheel 21. The handle 6 is provided with a socket or perforation 22 constituting a journal bearing for a shaft 23 carrying a sprocket pinion 24 and terminating in a crank handle 25. A bar 26 secured to one of the yoke arms 8 at one end and provided with a perforation at the other end serves to support the shaft 23 outside of the sprocket 24, and another brace bar 27 connected at one end to the platform 1 and at the other having a perforation through which passes the shaft 23 coöperates with the bar 26 to support the shaft 23. The pinion 24 is connected to the sprocket wheel 21 by a sprocket chain 28. It will be observed that the shaft 23 is journaled in the handle 6 at a point within reach of an operator grasping the hand-hold 7, and, therefore, such operator may guide and propel the truck while at the same time manipulating the handle 25 to wind a wire strand 29 upon the reel 20 or to permit the strand to be unwound therefrom.

When it is desired to wind up wire such as barbed wire this may be done and the tension may be regulated to a nicety all by one person who with one hand can turn the crank 25 and with the other can guide the truck by means of the handle 6. The wire-winding mechanism is particularly useful in tensioning barbed wire since such wire in running out from the reel may catch and jerk and is apt, unless put under tension, to become loose and tangled. Should the wire tend to be too loose it is an easy matter to rewind some of it upon the reel. Again, in winding up the wire one person can put on sufficient tension by retarding the progress of the truck while at the same time manipulating the handle 25 in such manner as to wind the wire upon the reel. Or, the operator may find it necessary under some circumstances to push the truck forward a little and then perhaps to retard its forward motion as the winding progresses, depending upon the character of the ground over which the truck passes.

In order that the crank shaft 23 may be locked in position there is provided a detent or locking means 30, shown in the drawings, Fig. 4, as an ordinary pawl and ratchet. By this means the wire can be stretched ready for stapling when the end of the platform is held against movement, as by placing it against an obstruction, and the crank shaft is suitably turned.

I claim:—

1. A truck comprising suitable supporting wheels, a drop axle, a platform supported by said axle at all times below the axis of the wheels, a handle connected to the axle and platform and capable of tilting the platform about the axis of the wheels as a pivot to a position where one edge of said platform will engage the ground, and a leg pivoted at one end to the handle and having the other end arranged to engage the ground and hold the end of the platform in engagement with the ground.

2. A truck comprising suitable wheels, a drop axle having its ends formed into journals for the wheels and between the wheels carrying a platform close to the ground, braces extending from the axle to the ends of the platform, a handle and yoke connection between the same and the axle adjacent to the wheels, braces from the handle to the adjacent end of the platform, and a leg pivotally supported at one end from the handle and of such length as to engage the ground when the platform is tilted to bring the end remote from the handle into engagement with the ground.

3. A truck comprising suitable wheels, a drop axle therefor, a platform supported by the axle, a handle connected to the axle and to the platform, reel supports adjacent to the axle, a reel adapted to said supports, a crank shaft having one end journaled in the handle near the manipulating end thereof, brace rods connected to the platform and handle for supporting the other end of the crank shaft, and connections between the crank shaft and reel for rotating the latter when the crank shaft is rotated.

4. A truck comprising suitable wheels, a drop axle therefor, a platform supported by the axle, a handle connected to the axle and to the platform, reel supports adjacent to the axle, a reel adapted to said supports, a crank shaft having one end journaled in the handle near the manipulating end thereof, brace rods connected to the platform and handle for supporting the other end of the crank shaft, connections between the crank shaft and the reel for rotating the latter when the crank shaft is rotated, and a leg pivotally supported by the handle and arranged to engage the ground in such manner as to bring the end of the platform remote from the handle also into engagement with the ground.

In testimony that I claim the foregoing as my own, I have hereto affixed my signature in the presence of two witnesses.

JACOB F. DE LONG.

Witnesses:
  DELRO A. REEVE,
  O. P. WELLS.